Figure 1:
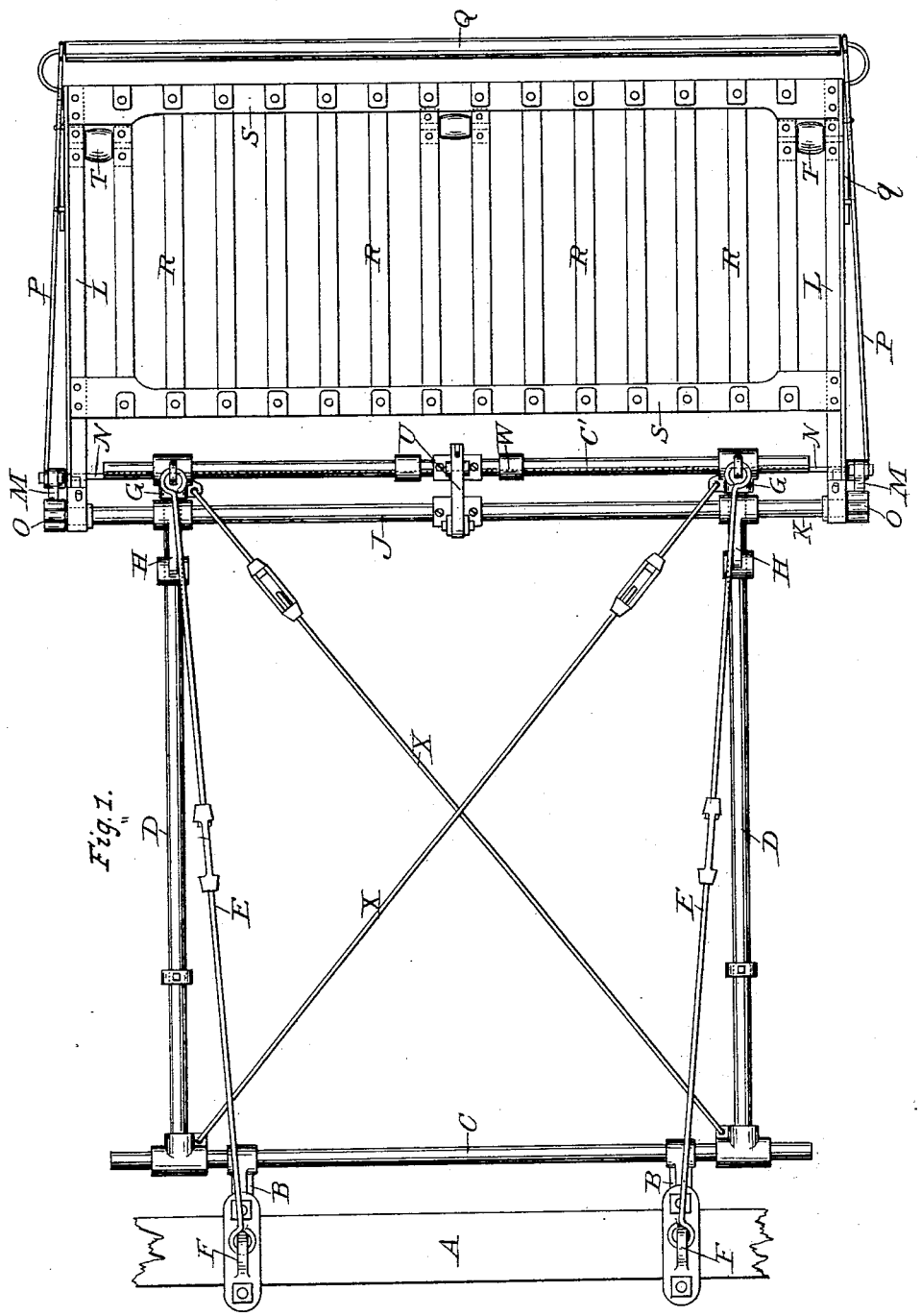

(No Model.)
2 Sheets—Sheet 1.

H. BURDEN.
CAR FENDER.

No. 587,789. Patented Aug. 10, 1897.

Witnesses
Fred J. Lawrence
William A. Treadwell

Inventor
Henry Burden

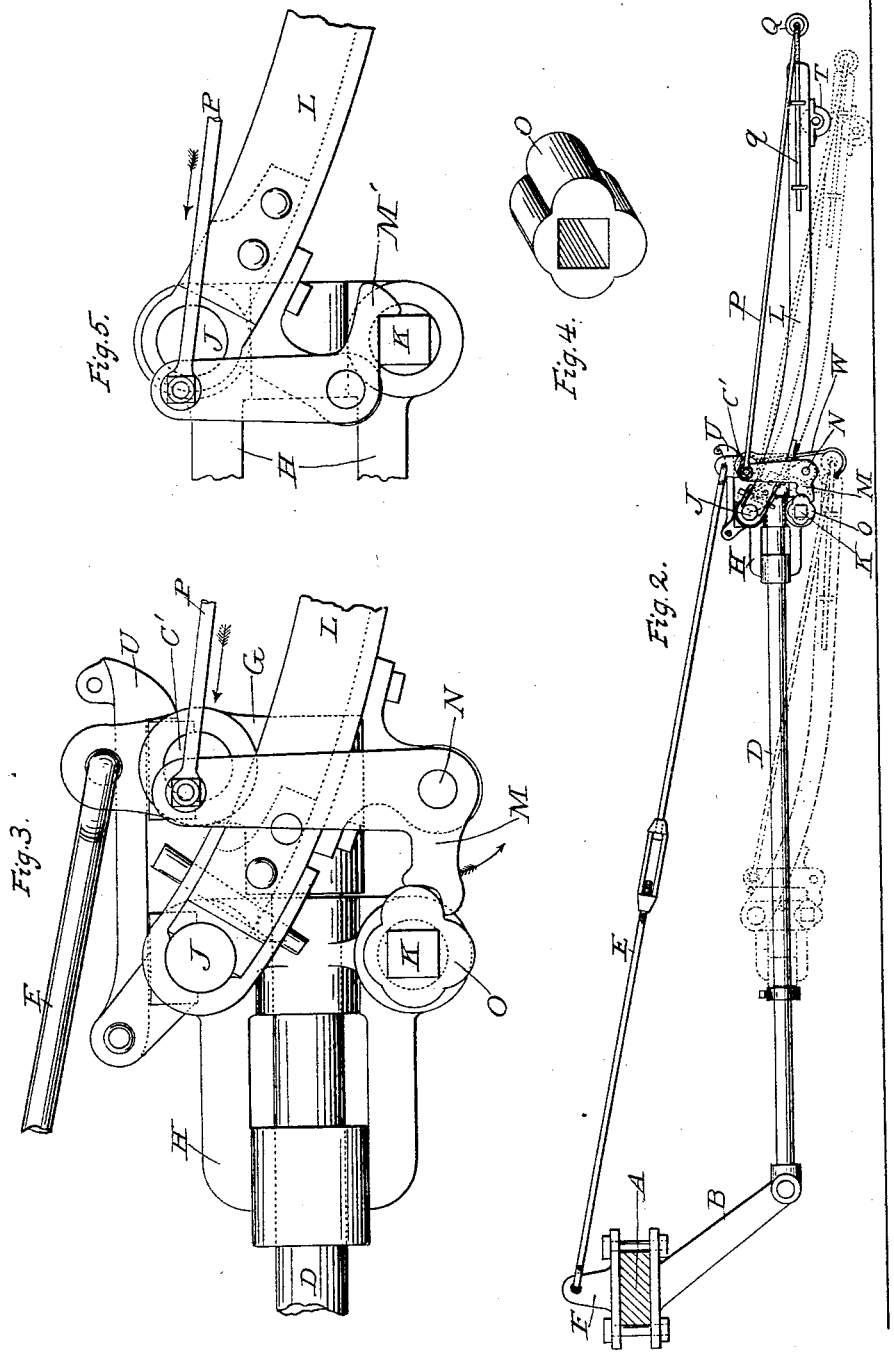

UNITED STATES PATENT OFFICE.

HENRY BURDEN, OF TROY, NEW YORK.

CAR-FENDER.

SPECIFICATION forming part of Letters Patent No. 587,789, dated August 10, 1897.

Application filed February 16, 1897. Serial No. 623,626. (No model.)

*To all whom it may concern:*

Be it known that I, HENRY BURDEN, a citizen of the United States, residing at Troy, in the county of Rensselaer and State of New York, have invented certain new and useful Improvements in Car-Fenders; and I do hereby declare the following to be a full, clear, and exact description of the invention, such as will enable others skilled in the art to which it appertains to make and use the same.

My invention has for its object to provide a car-fender adapted to adjust itself automatically and to safely remove an obstacle from in front of a car. This I accomplish by the means illustrated in the accompanying drawings, in which—

Figure 1 is a plan view of a fender embodying my invention. Fig. 2 is a side view of my device. Fig. 3 is a side view of a sliding carriage, the rear end of a cradle-bar, and a locking-lever. Fig. 4 is a perspective view of a bearing-block. Fig. 5 is a side view of a portion of a sliding carriage, the rear end of a cradle-bar, and a modification of locking-lever.

As illustrated in the drawings, the main frame of the fender is composed of side bars D, secured to the transverse bars C and C', and preferably adjustable laterally on said transverse bars C and C' and thereby adapted to be attached to cars having differently-constructed appliances, such as steps and scrapers, secured to their forward ends. This lateral adjustment of the side bars D is accomplished by moving the connecting ends of the side bars laterally on the cross-bars and securing them in the desired position by any suitable means. Brace-rods X, extending diagonally, are connected with opposite corners of the main frame and are provided with turnbuckles, by means of which the main frame is made rigid, and the side bars D are secured at right angles to the transverse bars C and C'.

The transverse bar C is supported by brackets B and secured to the cross-bar A of a car-truck. The cross-bar C' is preferably supported on brackets G, secured to the side bars D, slightly above the plane of said side bars.
I prefer to make the side bars D and cross-bars of the main frame of tubing, so as to obtain the greatest strength with the least weight. The forward end of the main frame is supported by sustaining-rods E, secured at their forward ends to the main frame and at their rear ends to the car-truck. These sustaining-rods E are provided with turnbuckles, which enable the length of the rods E to be extended or diminished, and thereby adjust the elevation of the forward end of the main frame and the cradle supported on said forward end. Carriages H are mounted on each of the side bars D, so as to slide freely lengthwise of said bars and support the ends of the transverse rods J and K. The upper transverse rod J supports the ends of the side bars L of the cradle, and the lower transverse rod K is preferably provided with square ends, which support bearing-blocks O, having sides of different thickness.

Locking-levers M are mounted on the cradle in any suitable manner, preferably by means of a transverse rod N, supported by brackets attached to the side bars L of the cradle. The locking-levers M have offset ends which abut against the bearing-blocks O, and the vertical height of the front of the cradle may be varied by adjusting the bearing-blocks O on the cross-bar K, so as to bring the side of the bearing-blocks having the desired thickness against the offset ends of the lever M. By bringing the thickest side of the blocks O in contact with the offset ends of the levers M the distance between the cross-bar K and the pivotal point of attachment of the levers M is increased, and consequently the front end of the cradle is adjusted at its greatest height above the ground. On the contrary, when the thinnest side of the bearing-blocks O is brought in contact with the offset ends of the levers M the distance between the cross-bar K and the pivotal point of attachment of the levers M is diminished and the front end of the fender is adjusted in a plane nearer the ground. The pivotal point of attachment of locking-levers M is outside of the horizontal plane of the cross-bar K. As shown in Fig. 3, such pivotal point of attachment cross-bar N is slightly below the horizontal plane of the cross-bar K. The weight of the cradle causes the offset ends of the levers M to bear firmly against the bearing-blocks O, and as such ends extend slightly upward they form braces, which transmit the weight of the cradle to the cross-bar K and the carriages H.

Connecting-rods P are secured at their rear ends to the upper portion of the locking-levers M and at their forward ends to the transverse trip-bar Q, secured to the front of the cradle. The ends of the trip-bar Q are bent backward and move in ways or eyelets $q$ on the side bars L of the cradle. Transverse bars S are secured to the side bars L of the cradle and support a series of cross-bars R. The cradle is also provided with rollers T, having preferably a rubber surface and curved outline. When the fender is in use, the cradle projects outward from the end of the car and is held in position by means of the locking-levers M and bearing-blocks O, as indicated by full lines in Fig. 2. When, however, the trip-bar Q strikes an obstacle, the rods P and the upper ends of the levers M are forced backward, thereby releasing the offset ends of the levers M from contact with the bearing-blocks O, and the front end of the fender then drops to the ground, as indicated by dotted lines in Fig. 2. The cradle is held against a bodily backward movement by means of a catch U, secured at one end to the cross-bar J and adapted to engage the cross-bar C' of the main frame with its other end. When the fender is not in use, the catch U may be released and the cradle moved backward bodily into the position indicated by dotted lines in Fig. 2, and when in such position the front end of the cradle may be supported by any suitable means.

I do not desire to be limited to the construction hereinabove described for adjusting the distance between the pivotal point of attachment of the levers M and the transverse rod K, so as to adjust the height of the front end of the cradle. In some instances I propose to dispense with the bearing-blocks O and permit the offset ends of the levers M to bear against the bar K, as shown in Fig. 5. In such instances the pivotal point of attachment of the levers M is above the plane of the cross-bar K, and the offset ends of the locking-levers M form a latch adapted to engage the end of the cross-bar K. In such cases, moreover, the distance between the cross-bar K and the pivotal point of attachment of the locking-levers may be made adjustable by any suitable means.

What I claim is—

1. In a car-fender a main frame provided with transverse bars, side bars adjustable laterally on said transverse bars, and diagonally-arranged brace-rods and connecting turnbuckles, substantially as shown and described.

2. In a car-fender the combination with a main frame having laterally-adjustable side bars, of sliding carriages mounted on said side bars and adjustably secured to a transverse bar, and a cradle supported on said transverse bars, substantially as shown and described.

3. In a car-fender, the combination with a main frame attached to the truck of a car, of sliding carriages mounted on the side bars of said main frame, a cradle hinged to said carriages, locking-levers mounted on said cradle, adjustable bearing-blocks, a sliding trip-bar, and rods connecting said trip-bar and locking-levers, substantially as shown and described.

4. In a car-fender, the combination with a main frame, of sliding carriages mounted on the side bars of said main frame, a cradle hinged to said sliding carriages, and locking-levers pivoted to said cradle and provided with offset ends adapted to bear against said carriages and support the cradle, substantially as shown and described.

5. In a car-fender the combination with a main frame of sliding carriages mounted on the side bars of said frame, a cradle hinged to said carriages, and locking-levers pivoted to said cradle having their lower ends and the carriages adjustable relatively to each other so as to vary the height of the front end of the cradle, substantially as shown and described.

6. In a car-fender the combination with a main frame, of sliding carriages mounted on the side bars of said main frame, a cradle hinged to said sliding carriages, and locking-levers having offset ends adapted to bear against said carriages and pivoted to said cradle outside of the horizontal plane of the point of contact between said offset ends and carriages, substantially as shown and described.

In testimony whereof I affix my signature in presence of two witnesses.

HENRY BURDEN.

Witnesses:
ROBERT W. HARDIE,
W. A. TREADWELL.